United States Patent [19]

Hass et al.

[11] 4,331,639
[45] May 25, 1982

[54] PROCESS FOR REMOVING $SO_x$ AND $NO_x$ COMPOUNDS FROM GAS STREAMS

[75] Inventors: Robert H. Hass, Fullerton; Walter Albertson, Brea, both of Calif.

[73] Assignee: Union Oil Company of California, Los Angeles, Calif.

[21] Appl. No.: 242,611

[22] Filed: Mar. 11, 1981

[51] Int. Cl.³ .............................................. B01D 53/34
[52] U.S. Cl. .................................... 423/235; 423/243; 423/611
[58] Field of Search ........................ 423/235, 243, 351

[56] References Cited

U.S. PATENT DOCUMENTS

| | | | |
|---|---|---|---|
| 2,142,987 | 1/1939 | Bacon et al. | 423/539 |
| 2,664,441 | 12/1953 | Owens et al. | 260/347.3 |
| 2,697,725 | 12/1954 | Bryce | 562/513 |
| 2,729,543 | 1/1956 | Keller | 423/575 |
| 3,397,963 | 8/1968 | Wagner | 423/569 |
| 3,584,042 | 6/1971 | Yavorsky et al. | 562/609 |
| 3,592,850 | 7/1971 | Mazzocco et al. | 562/609 |
| 3,687,614 | 8/1972 | Yavorsky et al. | 423/243 |
| 3,687,615 | 8/1972 | Gorin et al. | 423/243 |
| 3,928,537 | 12/1975 | Saitoh et al. | 423/243 |
| 3,961,034 | 6/1976 | Bostian et al. | 423/181 |
| 3,984,522 | 10/1976 | Saito et al. | 423/235 |
| 4,013,430 | 3/1977 | Adachi et al. | 55/37 |
| 4,055,623 | 10/1977 | Saitoh et al. | 423/235 |
| 4,071,602 | 1/1978 | Pearce | 423/243 |
| 4,083,944 | 4/1978 | Chalmers | 423/567 |

FOREIGN PATENT DOCUMENTS 52-18468 of 1977 Japan .................................. 423/235

OTHER PUBLICATIONS

"Reactions with Addition Compounds Containing Activated Formic Acid", published in Augwandte Chemie, International Edition in English, Wagner, vol. 9, 1970, pp. 50-54.

"Amber—Hi—Lites", Special Issue, Jan. 1971, Rohm & Haas Co., 7 pages. 4n 30 "Amberlite IRA-47", May 1970, Rohm & Haas Co.

"Amber—Hi—Lites", Special Issue No. 159, Rohm & Haas Co. 1978.

"$NO_x$ Abatement for Stationary Sources in Japan", EPA-600/7-77-103b, Sep. 1977.

"Potassium Formate Process for Removing $SO_2$ From Stack Gas", (Sep. 1970), Yavorsky et al., Environmental Science & Technology, vol. 4, No. 9, pp. 757-765.

*Primary Examiner*—G. O. Peters
*Attorney, Agent, or Firm*—Dean Sandford; Gregory F. Wirzbicki

[57] ABSTRACT

Gas streams containing $SO_x$ and/or $NO_x$ compounds are treated in an absorption-regeneration process for removal of the $SO_x$ and/or $NO_x$ compounds. The process in one embodiment removes $SO_x$ compounds from a stack gas or other feed gas stream by (1) absorbing the $SO_x$ into a novel aqueous liquid absorbent comprising formic acid and an alkanolamine containing a tertiary amine functional group and (2) regenerating the absorbent when spent by subjecting the spent absorbent to an elevated temperature above that utilized for absorption of said $SO_x$, said elevated temperature being sufficient to convert a substantial proportion of the dissolved $SO_x$ to elemental sulfur and/or $H_2S$. If $NO_x$ compounds are present in the stack gas stream, they may also be removed, $NO_2$ being removed without modification of the process for removing $SO_x$ compounds, and NO by providing in the absorbent an iron (II) chelate, such as a chelate of ferrous ion with ethylenediaminetetraacetic acid. Regeneration of the spent absorbent containing absorbed NO is accomplished under conditions similar to those employed for spent absorbents containing absorbed $SO_x$ compounds. During regeneration, the dissolved $SO_x$ compounds are converted to hydrogen sulfide and/or sulfur and the dissolved $NO_x$ compounds are converted to nitrogen. The invention is most useful for removing $SO_2$ from gas streams.

2 Claims, 1 Drawing Figure

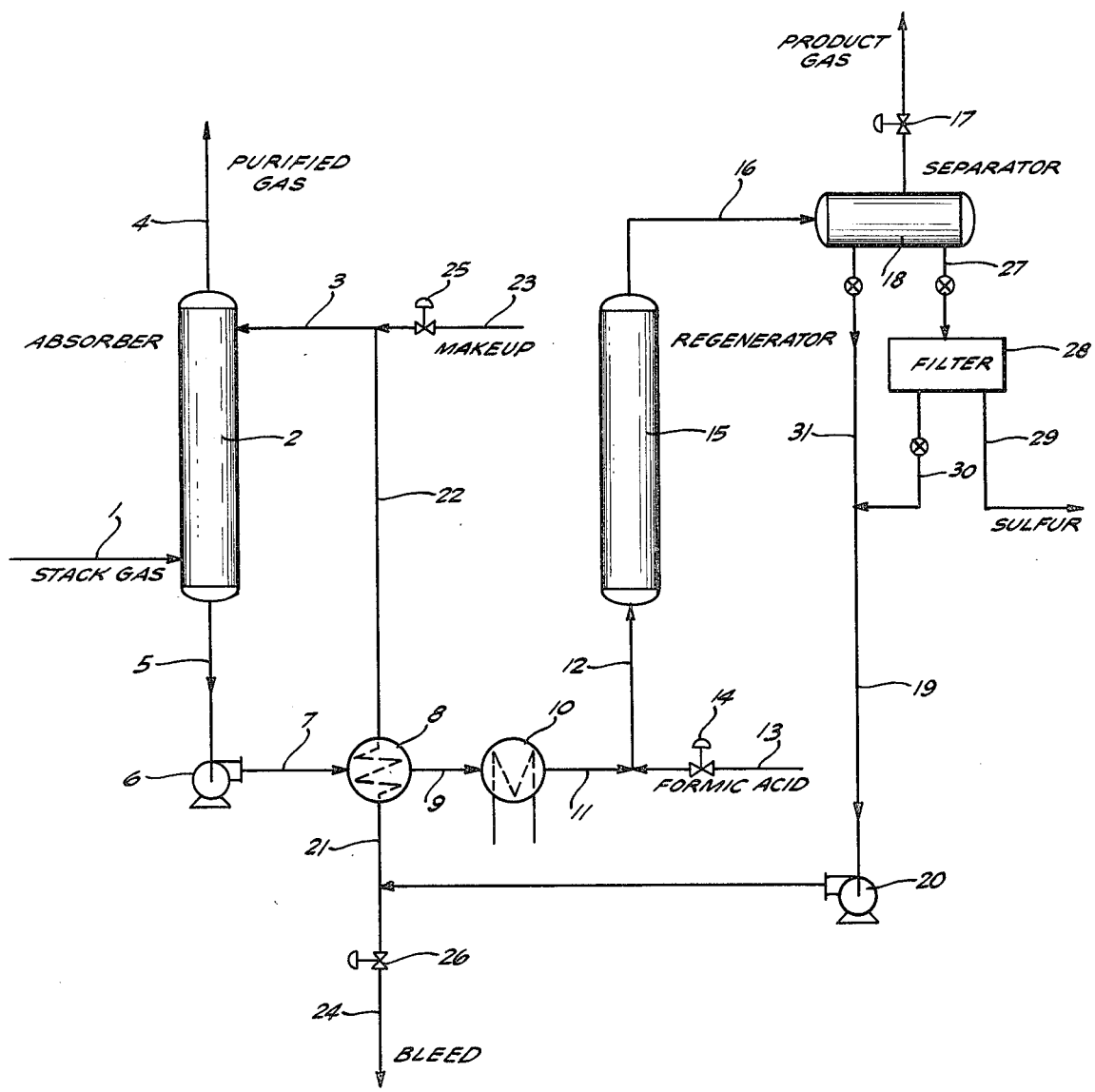

PROCESS FOR REMOVING $SO_x$ AND $NO_x$ COMPOUNDS FROM GAS STREAMS

BACKGROUND OF THE INVENTION

This invention relates to the removal of $SO_x$ and $NO_x$ compounds from waste gas streams. More particularly, the invention relates to the removal of $SO_2$, $SO_3$, NO and $NO_2$ from industrial stack gases.

The burning of coal or oil as fuel in a boiler or furnace produces a flue gas (or stack gas) usually containing $SO_2$, $SO_3$, and $NO_x$. The concentration of these components in a particular stack gas depends upon such factors as the concentration of sulfur and nitrogen components in the fuel, the metals concentration in the fuel, the air rate fed to the boiler or furnace, and the temperature of combustion. A stack gas, however, will usually contain between about 10 and 2000 ppmv $NO_x$ and between about 100 ppmv and 5 mole percent $SO_x$ compounds, with the large majority of the latter, usually at least about 95% thereof, being in the form of $SO_2$.

Before a stack gas containing $SO_x$ compounds may be discharged to the atmosphere, many environmental regulatory agencies require that the stack gas be desulfurized, that is, that the concentration of sulfur compounds therein be reduced to specified levels. Similar regulations require the removal of $NO_x$ components in stack gas, largely for the reason that such components contribute to photochemical smog.

The most conventional method presently utilized to remove $SO_x$ compounds from a stack gas involves contacting the stack gas with a liquid absorbent containing dissolved lime or caustic. But although such a process is favorable from a cost standpoint, it is largely ineffective for removing NO, which might also be present in the stack gas. In addition, since the spent absorbent obtained from a lime or caustic treatment is regenerable only by extremely costly techniques, the spent absorbent is usually not regenerated; instead, it is allowed to accumulate for waste disposal, which requires in many instances the daily handling of tons of spent absorbent. Thus, waste disposal of spent absorbent is a nuisance at the least and oftentimes a very difficult task.

Accordingly, it is an object of this invention to provide a process for removing $SO_x$, and most particularly $SO_2$, from a gas stream while minimizing the amount of waste products produced. It is a further object to provide a process for (1) effectively removing either or both $SO_x$ and $NO_x$ components from a gas stream by absorption in an aqueous liquid and (2) regenerating the aqueous liquid when laden with dissolved $SO_x$ and $NO_x$ compounds such that said $SO_x$ compounds are converted to hydrogen sulfide and/or sulfur and the $NO_x$ compounds to nitrogen. It is a most especial object of the invention to provide a process for absorbing $SO_2$ into an absorbent and subsequently regenerating the spent absorbent by converting the absorbed $SO_2$ to sulfur and/or hydrogen sulfide, with the process having a high efficiency for the overall conversion of the absorbed $SO_2$ to sulfur and/or hydrogen sulfide. Other objects and advantages of the invention will be apparent in view of the following description of the invention.

SUMMARY OF THE INVENTION

According to this invention, $SO_2$ present in stack gases and other feed gases are removed therefrom by contact in an absorption zone with a liquid absorbent comprising an aqueous solution of the reaction product of formic acid and an alkanolamine containing a tertiary amine functional group. The absorption is accomplished at relatively low temperatures, sufficient to absorb the $SO_2$ without producing significant amounts of $H_2S$ and/or sulfur.

Provision is also made in the invention for regenerating the spent absorbent to a form once again active for removing $SO_2$. This is accomplished by adding formic acid or oxalic acid to the spent absorbent and then heating the spent absorbent in a regeneration vessel to a temperature such that the dissolved $SO_2$ is converted to $H_2S$. Depending upon the temperature the spent absorbent is heated to, the dissolved $SO_2$ may be converted completely to $H_2S$ or only partially so, with increasing temperatures yielding higher conversions to $H_2S$. Thus, in one embodiment of the invention, the $SO_2$ is essentially completely converted to $H_2S$, and the $H_2S$ is first separated from the spent absorbent in the regeneration vessel and then converted to elemental sulfur in facilities separate therefrom. Alternatively and more preferably, the temperature of the regeneration vessel is controlled so that only a portion of the $SO_2$ is converted to $H_2S$, which $H_2S$ reacts with the remainder of the $SO_2$ to produce sulfur in the regeneration vessel by the aqueous Claus reaction:

$$SO_2 + 2H_2S \rightarrow 3S + 2H_2O \qquad (I)$$

It is apparent from the foregoing reaction that the maximum conversion of absorbed $SO_2$ to elemental sulfur is accomplished when the temperature of the regeneration vessel is controlled so that about two-thirds of the $SO_2$ is converted to $H_2S$.

The foregoing process is also useful when $NO_2$ and/or $SO_3$ are to be removed from the feed gas. The $NO_2$ and $SO_3$ are removed in the absorption zone and then, during regeneration, the dissolved $NO_2$ is converted to nitrogen and the dissolved $SO_3$ under severe conditions is converted to hydrogen sulfide.

When the feed gas contains nitric oxide (NO), the process of the invention is modified by providing a ferrous chelate in the absorbent. In this embodiment, the ferrous chelate removes NO in the absorption zone by forming an adduct therewith. Subsequently, during regeneration, the adduct is decomposed, liberating innocuous nitrogen and producing a ferrous chelate active for removing NO. The active ferrous chelate is recycled to the absorption stage as a component of the regenerated absorbent and is utilized therein to remove more NO from the feed gas.

A further embodiment of the invention comprises a process for simultaneously removing both $SO_x$ and NO compounds from a gas stream utilizing an absorbent composition comprising a ferrous chelate-containing aqueous liquid having had added thereto formic acid and an alkanolamine containing a tertiary amine functional group. After absorption of the $SO_x$ and $NO_x$ compounds, the absorbent may be regenerated by raising the temperature thereof, usually above about 300° F. for best results, and reacting the absorbed $SO_x$ and $NO_x$ compounds with available formic acid to produce hydrogen sulfide and elemental nitrogen, respectively.

In view of the foregoing, it can be seen that the invention also provides a highly effective catalytic absorbent composition by the addition of formic acid and an alkanolamine containing a tertiary amine functional group to an aqueous liquid. The resulting composition, which includes the dissolved reaction product of formic acid and the alkanolamine, is highly effective, for example, for absorbing $SO_2$ at temperatures below about 150° F. and for subsequently catalyzing the conversion of the absorbed $SO_2$ to hydrogen sulfide at more elevated temperatures, such as above about 250° F. Similarly, when a ferrous chelate is present in the absorbent, the absorbent is highly useful for removing NO and converting the dissolved NO to elemental nitrogen, even at relatively low temperatures, such as 125° F.

As used herein, the term "absorbent" refers to the aqueous medium used in the process to remove $SO_x$ and $NO_x$ from feed gases, regardless of the particular mechanism and/or mechanisms by which the $SO_x$ and $NO_x$ compounds are removed from the feed gas and retained by the absorbent. Also the term "$SO_x$" refers to $SO_2$ and $SO_3$ and "$NO_x$" to NO and $NO_2$.

BRIEF DESCRIPTION OF THE DRAWING

The drawing is a schematic flowsheet of the process of the invention for removing $SO_x$ and/or $NO_x$ compounds from a stack gas or other gas stream. For simplicity and ease of understanding, such conventional devices as pressure relief valves, temperature controllers, and back pressure regulators have not been represented in the drawing.

DETAILED DESCRIPTION OF THE INVENTION

Gas streams suitable for treatment by the process of this invention are those containing $SO_x$ and/or $NO_x$ compounds. Preferred gas streams for treatment herein contain at least some $SO_2$, most preferably in concentrations exceeding 500 ppmv, and the most preferred gas stream contains $SO_2$ and virtually no $SO_3$. Such gas streams include a number of stack gas streams, as well as such waste gas streams as gases produced by roasting sulfided ores and Claus tail gases that have been subjected to oxidation so as to contain $SO_2$ as essentially the only sulfur component therein. The invention is particularly suited to treating particulate-free stack gas streams for $SO_2$ removal. A typical stack gas stream obtained by the combustion of a sulfur-containing fossil fuel contains the several gaseous components listed in Table I in the ranges of concentration shown.

TABLE I

| Component | Mol % | Component | ppmv |
|---|---|---|---|
| $O_2$ | 1–5 | CO | 0–500 |
| $CO_2$ | 10–20 | $NO_x$ | 10–2000 |
| $H_2O$ | 5–25 | $SO_2$ | 100–50,000 |
| $N_2$ | 70–75 | $SO_3$ | 0–200 |

The method of the invention will now be described in detail, with attention first being directed to removing $SO_x$ and then to removing $NO_x$.

$SO_x$ Removal

Referring now to the drawing, the preferred embodiment of the invention will be described with relation to desulfurizing a particulate-free stack gas of the kind shown in Table I but preferably only containing trace proportions of $SO_3$, i.e., less than about 10 ppmv. The stack gas is fed by line 1 at a convenient temperature, usually less than about 200° F., and at a rate between about 1000 SCF/hr and about 100,000 SCF/hr and at a pressure slightly above atmospheric but preferably less than about 15 psig into absorber 2. The absorber may comprise such suitable gas-liquid absorption equipment as a packed tower, a multi-plate column, or a venturi scrubber, but the design should be such that sufficient contact time is provided for the $SO_x$ components to react as fully as possible with the fresh absorbent introduced through line 3 and make-up line 23. Preferably, the absorber is of a packed tower design, and the stack gas is passed countercurrently to the flow of the absorbent. An essentially $SO_x$-free and desulfurized product gas is thus discharged to the atmosphere by line 4 while spent absorbent containing dissolved $SO_x$ compounds is withdrawn via conduit 5.

The fresh absorbent feed into absorber 2 via lines 3 and 23 may be prepared by dissolving formic acid and one or more alkanolamines containing a tertiary amine functional group into an aqueous medium. The absorbent herein may be characterized as an aqueous solution containing the reaction product of formic acid and an alkanolamine containing a tertiary amine functional group. The more suitable alkanolamines for use in the invention boil above about 300° F. at atmospheric pressure, and the most useful alkanolamines are of the formula:

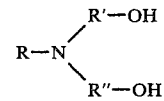

where R is an alkyl or alkanoyl group containing at least 1 carbon atom, preferably between 1 and 10, and where R' and R'' are alkyl groups containing at least 2 carbon atoms, although not necessarily an equal number of carbon atoms, with the preferred number of carbon atoms in R' and R'' being between about 2 and 10. The alkanolamine is most preferably selected from the group consisting of methyldiethanolamine, triethanolamine, and triisopropanolamine. These amines and other alkanolamines of the chemical formula set forth above have an advantage in that they have relatively high boiling points, usually above about 400° F. at atmospheric pressure, and thus may safely be used in absorber 2 without fear of releasing substantial quantities of the amine to the atmosphere with the purified product gas released through line 4. In addition, these amines are non-toxic and may be safely handled.

Usually, the amounts of the alkanolamine and formic acid are such that the resulting absorbent composition is effective for absorbing $SO_x$ compounds and has a pH between about 2.5 and 6.5, preferably 3.0 and 4.0. A preferred composition for the fresh absorbent entering the absorber comprises an aqueous solution containing the alkanolamine in a 0.5 to 5.0 molar concentration and sufficient formic acid to produce a pH in the 3.0 to 4.0 range. A still more highly preferred absorbent composition consists essentially of the alkanolamine in a 1.0 to 3.0 molar concentration and sufficient formic acid to maintain the pH between 3.0 and 4.0, and most preferably, 3.3 to 3.5. Typical absorbent compositions contain 2 to 4 moles of formic acid per mole of alkanolamine, and preferably 3 moles of formic acid per mole of alkanolamine.

The absorbent compositions used in the invention preferably consist essentially of water, formic acid, and one or more alkanolamines. In alternative embodiments of the invention, however, other ingredients may be present in the absorbent composition. For example, a salt of formic acid, such as sodium formate, may be included in the absorbent composition to take advantage of the buffering effect such salts provide in the relatively low pH ranges of 3.0 to 5.0. The most useful salts to be added to impart buffering properties to the absorbent composition are sodium formate, potassium formate, and ammonium formate.

Although the invention is not intended to be limited to any particular theory of operation, it is believed that the chemical reactions occurring in the absorber between the gaseous components in a stack of composition shown in Table I and the components of the aqueous absorbent include the following:

$$SO_2 + H_2O \rightleftharpoons HSO_3^- + H^+ \rightleftharpoons 2H^+ + SO_3^{--} \quad (II)$$

$$SO_3 + H_2O \rightleftharpoons HSO_4^- + H^+ \quad (III)$$

$$2HSO_3^- + O_2 \rightarrow 2HSO_4^- \quad (IV)$$

$$HSO_4^- \rightleftharpoons H^+ + SO_4^{--} \quad (V)$$

When the absorber is operated under preferred conditions, the flow rate of the absorbent fed via line 3 is so correlated with the amount of $SO_x$ removed from the stack gas that spent absorbent is withdrawn from absorber 2 via conduit 5 at a pH no lower than 1.0 to 1.5 units below that of the fresh absorbent. Usually, since the absorbent utilized in the preferred embodiment has an acid pH, the pH of the spent absorbent will, in the preferred embodiment, also have an acid pH, a feature which avoids the withdrawal of a spent absorbent from absorber 2 rich in $CO_2$ removed from the stack gas by dissolution.

In the preferred embodiment of the invention, the spent absorbent removed by line 5 will usually be at a temperature below about 160° F. and have a pH only slightly below that of the fresh absorbent, usually no more than about 1.0 to 1.5 pH units lower. Thus, if the fresh absorbent has a pH of 4.0, the flow rate of the absorbent fed via line 3 is so correlated with the amount of $SO_x$ removed from the stack gas that the spent absorbent is withdrawn at a pH no lower than about 2.5 to 3.0.

The spent absorbent in line 5 must be regenerated before being recycled to absorber 2 through line 3. However, in order to regenerate the spent absorbent in accordance with the invention, it is first heated to an elevated temperature, usually between about 175° and 400° F., and preferably between 175° and 350° F., and most preferably to a temperature between 180° and 300° F. Thus, the absorbent in line 5 is directed by pump 6 through pipe 7 to heat exchanger 8 and heated by indirect heat exchange with heated, regenerated absorbent. The absorbent is then introduced by conduit 9 into a second preheater 10, wherefrom heated absorbent is obtained in line 11 at a temperature of at least 175° F., and most preferably at a temperature of about 180° to 300° F. To the heated absorbent is added an aqueous solution containing dissolved formic acid through line 13 and valve 14. The resulting mixture in pipe 12 is then fed into regenerator 15.

In regenerator 15, the spent absorbent solution, now containing added formate ion from the formic acid, is regenerated back to its active form by subjecting the solution to a temperature in the range of 175° to 350° F. and a pressure at least sufficient to prevent the absorbent from boiling. When subjected to the foregoing temperature and pressure conditions for a residence time between, for example, 0.5 and 50 hours, usually 1 to 35 hours, and preferably 2 to 10 hours, the absorbent laden with dissolved $SO_2$ and $SO_3$ is regenerated, yielding elemental sulfur and/or hydrogen sulfide, with elemental sulfur being the predominant product when regeneration temperatures between 175° and 210° F. are utilized and hydrogen sulfide being the predominant product at temperatures between 210° and 350° F., especially at temperatures above 275° F., such as 280° to 300° F. Chemical reactions believed to occur in regenerator 15 when elemental sulfur is produced are:

$$8SO_4^{-2} + 24HCO_2H \rightarrow S_8 + 24CO_2 + 16H_2O + 16OH^- \quad (VI)$$

$$8SO_3^{-2} + S_8 \rightarrow 8S_2O_3^{-2} \quad (VII)$$

$$4S_2O_3^{-2} + 8HCO_2H \rightarrow S_8 + 8CO_2 + 4H_2O + 8OH^- \quad (VIII)$$

$$8SO_3^{-2} + 16HCO_2H \rightarrow S_8 + 16CO_2 + 8H_2O + 16OH^- \quad (IX)$$

$$H^+ + OH^- \rightarrow H_2O \quad (X)$$

Chemical reactions believed to occur in regenerator 15 when hydrogen sulfide is produced are:

$$2H^+ + SO_3^{-2} + 3HCO_2H \rightarrow H_2S + 3CO_2 + 3H_2O \quad (XI)$$

$$H^+ + HSO_3^- + 3HCO_2H \rightarrow H_2S + 3CO_2 + 3H_2O \quad (XII)$$

$$2H^+ + S_2O_3^{-2} + 4HCO_2H \rightarrow 2H_2S + 4CO_2 + 3H_2O \quad (XIII)$$

Yet other reactions occurring in regenerator 15 may include:

$$O_2(aq) + 2HCO_2H \rightarrow 2CO_2 + 2H_2O \quad (XIV)$$

$$S_8 + 8HCO_2H \rightarrow 8H_2S + 8CO_2 \quad (XV)$$

Conditions known to favor the formation of elemental sulfur are: 198° F., 28.6 hours residence time, and 14.7 psia, and among those believed to favor the formation of hydrogen sulfide are: 252° F., 28.6 hours residence time, and 31 to 35 psia.

When preferred conditions are utilized in regenerator 15, the effluent in line 16 will be a two-phase fluid or a three-phase material comprising a non-condensable gas phase and a liquid phase of regenerated absorbent and, if sulfur is produced, a solid phase of rhombic sulfur. If the effluent is two-phase, it is directed to a gas-liquid separator 18, where a regenerated absorbent at a pH between about 2.5 and 6.0, preferably 3.5 to 4.0, is separated from the non-condensable gases and withdrawn through line 31. The non-condensable gases discharged through vent valve 17 contain a large proportion of $CO_2$, usually in a concentration of 60 to 90% by volume (dry basis), with the remainder of the gases comprising hydrogen, hydrogen sulfide, water vapor, nitrogen, and trace organosulfur gases. The non-condensable gases are preferably directed to sulfur recovery facilities (not shown in the drawing) wherein the $H_2S$ is converted to sulfur or $SO_2$, as by catalytically reacting the $H_2S$ with oxygen at a temperature above about 275° F., preferably above 300° F., in the presence of a catalyst comprising vanadium oxide or vanadium oxide plus bismuth oxide on silica-alumina (or other porous refractory oxide). More detailed disclosures relating to the catalytic conversion of $H_2S$ to sulfur or $SO_2$ may be found in the U.S. Pat. No. 4,123,507 herein incorporated by reference.

In the event a three-phase material is recovered from the regenerator, the foregoing described method is altered such that, after removal of the gas phase in separator 18, the remaining two-phase slurry comprising regenerated absorbent and solid sulfur is directed by line 27 to filtration zone 28 wherefrom elemental sulfur is recovered by line 29 and regenerated absorbent by line 30.

The regenerated absorbent recovered from either line 30 or 31 is directed by line 19 and pump 20 and conduit 21 to heat exchanger 8 and thence to absorber 2 via lines 22 and 3. Eventually, steady state conditions will be attained, and the fresh absorbent feed from make-up line 23 is either shut-off or reduced as required by operating control valve 25. Line 24 and control valve 26 are provided to bleed absorbent from the system as required.

Under steady state conditions, the regeneration of the absorbent is controlled largely by the amount of formic acid added via line 13 and the temperature maintained in regenerator 15. Formic acid is preferably added at a rate at least sufficient to effect full conversion of dissolved $SO_2$ components (largely in the form of sulfite or bisulfite ion) to $H_2S$ or elemental sulfur as desired according to:

$$3HCO_2H + SO_2 \rightarrow H_2S + 3CO_2 + 2H_2O \qquad (XVI)$$

$$2HCO_2H + SO_2 \rightarrow S + 2CO_2 + 2H_2O \qquad (XVII)$$

As should be apparent from the foregoing reactions, more formic acid is required for the conversion of $SO_2$ to hydrogen sulfide than to sulfur. And because higher temperatures are required for the conversion of dissolved $SO_2$ to hydrogen sulfide than to elemental sulfur, it can be seen that higher operating temperatures in regenerator 15 will require more formic acid addition through line 13 than will lower operating temperatures.

Under steady state conditions, the chemical composition of the regenerated absorbent in line 22 will contain not only the components originally added via make-up line 23, but also residual sulfur-containing anions, particularly sulfate anions. The concentration of these sulfur-containing anions will increase dramatically when conditions are maintained in regenerator 15 that do not result in high conversions of dissolved $SO_2$ to $H_2S$ or, less preferably, to sulfur or $H_2S$ plus sulfur. Even under preferred conditions, however, some sulfur-containing anions, and particularly sulfate anions, will increase in concentration in the circulating absorbent. Although extremely high conversions (usually exceeding 95%) of dissolved sulfite, bisulfite, and thiosulfate ions to hydrogen sulfide take place in regenerator 15, it has also been found that sulfate ions (formed, for example, by the direct dissolution of $SO_3$ or by the reaction of dissolved $SO_2$ with dissolved oxygen) prove exceptionally difficult to reduce in regenerator 15, and it is believed severe conditions are required, such as temperatures above 300° F., to effect high conversions of sulfate ion to hydrogen sulfide. Thus, unless severe conditions are resorted to, a bleed through line 24 will usually be necessary to avoid exceeding the solubility limit of sulfate salts in the circulating absorbent. It has, however, been found that a sulfate concentration as high as 10 g/l can be tolerated in the circulating absorbent without encountering difficulties.

The process as described is highly efficient when preferred conditions are utilized throughout. For a stack gas containing about 2000 vppm $SO_2$, the desulfurized purified gas discharged via line 4 typically contains less than 300 vppm, usually less than 40 vppm, of $SO_2$. The desulfurized purified gas typically will carry, on a mass per hour basis, less than 15% of the amount of $SO_2$ carried in the stack gas. Also in the preferred embodiment, the conversion of dissolved $SO_x$ components to sulfur and/or hydrogen sulfide in regenerator 15 will be at least 80%, usually at least about 90%, of the rate at which $SO_2$ is absorbed in absorber 2.

$NO_x$ Removal

Because many stack gases and other waste gas streams contain $NO_x$ compounds rather than, or in addition to, $SO_x$ compounds, the invention is accordingly also directed to removing $NO_x$ from gas streams. Although $NO_x$ is present in stack gases largely as NO, some stack gases may contain up to 5%, perhaps as much as 10%, of the $NO_x$ in the form of $NO_2$. $NO_2$ is readily absorbed in absorber 2 due to its high solubility in aqueous media. It is believed in the invention that, when the absorbent traversing absorber 2 contains dissolved sulfite ion, at least some $NO_2$ reacts in the absorber with sulfite ion to produce elemental nitrogen and sulfate ion, the latter then being reduced to hydrogen sulfide in regenerator 15 under severe conditions. Some $NO_2$ dissolves directly into the absorbent as nitrate or nitrite ions, which may be converted in regenerator 15 to nitrogen under conditions more mild than those required for sulfate reduction, usually at temperatures above 180° F., such as 180° to 200° F. Nitrogen produced by reduction of nitrate and/or nitrite ions in regenerator 15 is recovered as a component of the product gas obtained through vent valve 17.

The removal of NO from flue gases and the like is more difficult than is the removal of $NO_2$, but it has been found that the absorbent, after the addition of an iron (II) chelate thereto, becomes useful for absorbing NO. Thus, to remove NO (or NO and $SO_x$), the absorbent, in addition to formic acid and an appropriate alkanolamine, is also provided with a water-soluble iron(II) chelate, such as FE(II) EDTA (ferrous ion chelated by ethylenediaminetetraacetic acid) and Fe(II) HEDTA (ferrous ion chelated by N(hydroxyethyl) ethylenediaminetriacetic acid). Such chelates are usually present in the absorbent in a concentration between about 0.001 and 1.0 molar, preferably between about 0.1 and 0.25 molar. The chelate may be added to the absorbent solution in any of a variety of ways, with it being most preferred to add an alkali metal salt of EDTA or HEDTA and iron formate. If the iron formate is ferrous formate, the iron(II) chelate readily forms; if ferric formate, then ferric chelate forms, which is easily reduced to the necessary ferrous chelate by passage of the absorbent through regenerator 15.

When the absorbent passing through absorber 2 contains iron(II) chelate, it is highly effective for removing NO, most probably by the direct chemical reaction:

$$NO + Fe(II)EDTA \rightarrow NO.Fe(II)EDTA \text{ (Adduct)} \qquad (XVIII)$$

In addition, however, some of the iron(II) chelate may react with oxygen, if present in the feed gas, to yield an iron(III) chelate, such as Fe(III)EDTA (ferric ion chelated by ethylenediaminetetraacetic acid). But in regenerator 15, the spent absorbent containing dissolved NO and any iron(III) chelate is regenerated to a form once again containing the active iron(II) chelate, most probably by the following chemical reactions:

$$2NO \cdot Fe(II)EDTA + 2HCO_2H \rightarrow 2Fe(II)EDTA + N_2 + 2CO_2 + 2H_2O \quad (XIX)$$

$$2Fe(III)EDTA + HCO_2H \rightarrow 2Fe(II)EDTA + CO_2 + 2H^+ \quad (XX)$$

with the nitrogen and $CO_2$ produced in regenerator 15 being removed as components of the product gas stream discharged through vent valve 17.

It is most highly preferred when operating the absorber for removal of NO from gas streams also containing oxygen, and especially from gas streams essentially free of $SO_2$, that, on an hourly basis, for every mole of NO entering the absorber via line 1, the amount of ferrous chelate entering via line 3 is more than 1 but less than about 20 moles, and preferably between about 10 and 15 moles. Somewhat surprisingly, operating in this manner, as opposed to operating with a 50 to 1 or 100 to 1 molar ratio as conventionally practiced results in higher removals of NO in absorber 2. This strange result—where 10 to 15 moles of ferrous chelate proves more effective than 100 moles—is believed due to a complex series of chemical reactions involving the formation of an oxygen-ferrous chelate adduct, which reacts with the NO-ferrous chelate adduct, releasing NO and producing ferric chelate.

A highly beneficial feature of the invention when $NO_x$ removal is desired is that any iron(III) chelate formed in the absorber by reaction with oxygen and any iron(III) chelate deliberately added to the absorbent are converted to iron(II) chelate in regenerator 15 so as to insure the continuous removal of NO from the feed gas. Iron(III) chelate is not active for removing NO, and accordingly, when NO is to be removed, iron(III) chelate must be reduced to iron(II) chelate in regenerator 15. A highly convenient visual method for determining if the regenerated absorbent is sufficiently regenerated for purposes of NO absorption is by the color of the regenerated absorbent. Since iron(II) chelates are almost colorless, while most iron(III) chelates exhibit noticeable color, usually a brownish-red color in acidic media, the regenerated absorbent removed from separator 18 must either be almost colorless or exhibit a lighter color than the spent absorbent in line 5. Most usually, the regenerated absorbent will evince some color, usually a pale amber color, since the conversion of ferric chelate to ferrous chelate is usually not 100% complete. Thus, the preferred method of operation with iron chelate-containing absorbents results in the conversion of a spent absorbent of a relatively dark color to a regenerated absorbent exhibiting only a tinge of color, and the difference in color of the two liquids provides a quick indication that the regenerated absorbent is active for absorbing NO.

When the process of the invention is utilized to treat a stack gas containing $NO_x$, particularly in the form of NO, it has been found that the removal of $NO_x$ is often such that the purified gas removed from absorber 2 carries, on a mass per hour basis, less than 15%, usually less than 10%, of the amount of $NO_x$ carried in the stack gas. It has been found that the greatest removals of $NO_x$ in absorber 2 occur when the absorber operates at a temperature no greater than 140° F., with preferred operation being such that spent absorbent liquid is recovered in line 5 at a temperature between 120° and 140° C., and most preferably, at a temperature of 130° F. Of the NO absorbed in absorber 2, essentially all is converted to elemental nitrogen in the process of the invention, some in the absorber itself and some in the regenerator, with the chemical reactions in each presumably being in accordance with Reaction (XIX). Even at ambient temperature, the absorbent in the absorber is useful for removing NO and converting dissolved NO to nitrogen, assuming, of course, that the absorbent contains available formic acid for Reaction (XIX), this being supplied either by introducing an excess of acid via line 13 or supplying acid with the make-up via line 23. In any event, temperatures in the absorber and/or regenerator above about 125° F. are highly useful for converting dissolved NO to elemental nitrogen, with temperatures above about 150° F., and particularly above 175° F., being effective for essentially full conversion of dissolved NO to elemental nitrogen.

Unfortunately, the conversion of ferric chelate to ferrous chelate according to Reaction (XX) proves more difficult than for the conversion of the NO adduct to nitrogen by Reaction (XIX). The conversion of ferric chelate to ferrous chelate in regenerator 15, by Reaction (XX) or otherwise, has been found to be 84% effective at a temperature of 198° F. and 93% effective at 209° F. when both NO and $SO_2$ were in the feed gas and to be 46% effective at 209° F. when NO was present in a feed gas free of $SO_2$. As will be explained hereinafter in Example IV, the wide variance in the percentage conversions of ferric chelate to ferrous chelate is believed due to the reducing nature of $SO_2$.

As a final point, it should be noted that since $NO_x$ absorbed in the absorbent solution is essentially completely converted to nitrogen, the concentration of nitrogen components in the circulating absorbent does not increase in the manner of sulfate ion as hereinbefore described. Neither do undesirable nitrogen-containing components, such as ammonium ion, form in the absorbent solution.

The following Examples are provided to illustrate the preferred embodiment of the invention and to provide data relating to the performance of the invention. The Examples are not provided to limit the scope of the invention, which is defined by the claims.

EXAMPLE I

A simulated stack gas stream having the composition shown in Table II was passed at a pressure slightly greater than atmospheric into a three-foot laboratory-sized absorber containing ¼ inch ceramics Berl saddles at the rate of 1000 scc/min (scc referring herein to the calculated volumetric gas rate at 1 atm. and 60° F.). The absorber was operated at a temperature of about 130° F., and the simulated stack gas was passed upwardly in countercurrent flow with an aqueous liquid absorbent passing through the absorber at 70 ml/hr. The absorbent initially had a pH between 3.3 and 3.5 and consisted essentially of an aqueous solution of formic acid in a 6.0 molar concentration and methyldiethanolamine in a 2.0 molar concentration.

Spent absorbent recovered from the absorber was passed into a regenerator comprising a stirred reactor vessel. The volume of the reactor was approximately 2.0 liters, and the operating conditions maintained therein were 198° F. and atmospheric pressure. Concentrated formic acid (98% by weight) was continually added at the rate of 0.40 ml/hr to the spent absorbent solution entering the regenerator. To the bottom of the regenerator, connected by a rubber hose, was a sample bottle for collecting sulfur produced in the regenerator. Means were also provided to recover a product gas produced in the regenerator, which product gas was recovered at a rate of about 2.7 scc/min while regenerated absorbent was recovered and blended with sufficient water to recycle a stream of regenerated absorbent to the absorber at a rate of 70 ml/hr. Make-up water was added to the absorber as necessary to balance the amount of water that was lost due to evaporation.

The above described experiment was performed over a 210.5 hour time period, and many representative samples of both the purified gas stream recovered from the absorber and the product gas stream recovered from the regenerator were taken between the 116th and 210th hours of the experiment, and then analyzed, and an average of the results pertaining to these gas streams is shown in Table II. As the data in Table II show, approximately 89% of the $SO_2$ in the stack gas was removed by absorption into the liquid absorbent. In addition, samples of the absorbent solution at steady state conditions were taken and analyzed, and it was found that the absorbent had a pH of about 3.5 as it entered the absorber and about 3.3 when it left. The steady state sulfite concentration of the absorbent entering the regenerator was 1.8 g/l (calculated as $SO_3^{-2}$) and less than 0.1 g/l while leaving. The sulfate concentration was about 5.0 g/l (calculated as $SO_4^{-2}$) as the absorbent entered the regenerator and 1.9 g/l as it left and was increasing in the system at an average rate of 0.01 g/l per hour.

Based on the foregoing, it was concluded that the conversion of dissolved $SO_2$ in the absorbent as it passed through the regenerator was as follows: an 89.2% conversion to sulfur (later determined to be essentially pure rhombic sulfur), 9.4% conversion to sulfate ions, and a 1.4% conversion to $H_2S$.

TABLE II

| GAS STREAM COMPOSITIONS | | | |
|---|---|---|---|
| Gas Component | Simulated Stack Gas | Purified Gas | Product Gas |
| $SO_2$, vppm | 2140 | 240 | 120 |
| $O_2$, vol. % | 3.4 | 3.40 | — |
| $CO_2$, vol. % | 14.0 | 13.92 | 96.145 |
| $N_2$, vol. % | 82.39 | 82.66 | 1.875 |
| $H_2S$, vol. % | — | — | 1.039 |
| $H_2$, vol. % | — | — | 0 |
| $CH_4$, vol. % | — | — | .021 |
| Total $CH_3SH$, $CS_2$, COS as $SO_2$, vppm | — | — | 140 |

EXAMPLE II

The experiment described in Example I was continued for an additional 167.5 hours but with the stack gas composition altered so as to contain nitric oxide. The composition of this stack gas is shown in Table III. In this experiment, product gas was recovered from the regenerator at a rate of about 2.6 scc/min, but in other respects the operating conditions and gas flow rates were as specified in Example I.

Many representative samples of both the purified gas stream recovered from the absorber and the product gas stream recovered from the regenerator were taken during the 167.5 hours of the experiment and then analyzed. An average of the results pertaining to these gas streams is shown in Table III. As the data in Table III show, approximately 89% of the $SO_2$ in the stack gas was removed by absorption into the liquid absorbent. In addition, samples of the absorbent solution at steady state conditions were taken and analyzed, and it was found that the absorbent had a pH of about 3.5 as it entered the absorber and about 3.3 when it left. The steady state sulfite concentration of the absorbent entering the regenerator was 1.6 g/l (calculated as $SO_3^{-2}$) and less than 0.1 g/l while leaving. The sulfate concentration was about 6.0 g/l (calculated as $SO_4^{-2}$) as it entered the regenerator and 3.5 g/l as it left and was increasing in the system at an average rate of 0.02 g/l per hour.

Based on the foregoing, it was concluded that the conversion of dissolved $SO_2$ in the absorbent as it passed through the regenerator was as follows: a 75.0% conversion to sulfur (later determined to be essentially pure rhombic sulfur), 23.7% conversion to sulfate ions, and a 1.3% conversion to $H_2S$.

TABLE III

| GAS STREAM COMPOSITIONS | | | |
|---|---|---|---|
| Gas Component | Simulated Stack Gas | Purified Gas | Product Gas |
| $SO_2$, vppm | 2100 | 227 | 100 |
| NO, vppm | 546 | 483 | — |
| $O_2$, vol. % | 3.4 | 3.40 | — |
| $CO_2$, vol. % | 14.0 | 13.92 | 96.509 |
| $N_2$, vol. % | 82.35 | 82.61 | 1.354 |
| $H_2S$, vol. % | — | — | 0.946 |
| $H_2$, vol. % | — | — | 0.005 |
| $CH_4$, vol. % | — | — | 0.012 |
| Total $CH_3SH$, $CS_2$, COS as $SO_2$, vppm | — | — | 120 |

EXAMPLE III

An experiment similar to that of Example II was conducted with the primary difference being that the absorbent, when freshly prepared, containing not only formic acid in a 6.0 molar concentration and methyldiethanolamine in a 2.0 molar concentration but also monohydrated ferric formate ($Fe(CO_2H)_3 \cdot H_2O$) and sodium HEDTA in a 0.32 molar concentration. The experiment was conducted over a 335 hour time period, and it was apparent from analyses of many samples of the purified gas stream that the absorbent was highly efficient for removing both $SO_2$ and NO from the feed gas specified in Table III. At an operating temperature of 130° F., the absorber was found to be effective for removing 99.5% of the $SO_2$ and 94.4% of the NO.

At steady state, regeneration of the spent solution was such that, of the $SO_2$ that dissolved in the absorbent, 34.9% was converted to elemental sulfur, 51.3% to sulfate ion, and 13.8% to hydrogen sulfide (in the product gas). Of the NO that dissolved in the absorbent, virtually all was converted to elemental nitrogen, some in the absorber itself and some in the regenerator. (Although it was not determined for this particular experiment what proportion of the NO was converted to nitrogen in the absorber as opposed to the regenerator, data from other experiments show that roughly 60% of the dissolved NO is converted to nitrogen in the absorber and the remaining 40% in the regenerator.)

EXAMPLE IV

An experiment was performed in a manner similar to that of Example III except that (a) the simulated stack gas composition contained no $SO_2$, (b) the fresh absorbent solution contained ferrous chelate prepared from 0.18 molar of ferrous sulfate instead of ferric formate, and (c) the regenerator temperature was 209° F. rather than 198° F. as in Examples I, II and III. The experiment was conducted over a 142 hour time period, and at steady state it was found that the absorbent removed about 60% of the NO, with essentially full conversion of the dissolved NO to nitrogen being accomplished, partially in the absorber and the remainder in the regenerator. The low removal of NO in the absorber was discovered to be due in part to the low temperature utilized in the regenerator, which only reduced 46% of the incoming ferric chelate to ferrous chelate. Such low conversions of ferric chelate lowered the amount of ferrous chelate in the absorber, thereby lowering the amount of NO picked up in the absorber.

When the results of Example III and IV are compared, it will be seen that the conversion of ferric chelate to ferrous chelate in Example III was substantially higher than in Example IV—and this despite the lower regenerator temperature utilized in Example III. This anomoly is due to the presence of $SO_2$ in the feed in Example III, for when the experiment of Example IV was re-run with about 200 ppmv of $SO_2$ in the simulated stack gas, the conversion of ferric chelate to ferrous chelate was 93% and the NO removal in the absorber was 96%. Thus, dissolved $SO_2$ acts as a reducing agent for the conversion of ferric chelate to ferrous chelate, and when regeneration temperatures less than about 220° F. are utilized, high conversions of ferric chelate to ferrous chelate are possible provided $SO_2$ is present in the absorbent. Accordingly, one may obtain high removals of NO from stack gases and the like by either treating NO-containing but $SO_2$-free gases and utilizing regenerator temperatures above about 220° F. or by treating NO and $SO_2$-containing gases and utilizing regenerator temperatures above about 175° F.

Despite the foregoing, a caution must be expressed as to feed gases containing both NO and $SO_2$ components. Although in the re-run experiment of Example IV it was found that high removals of NO and conversions of dissolved NO to elemental nitrogen were obtained when $SO_2$ was present in the simulated stack gas, the concomitant conversion of dissolved $SO_2$ to sulfur and/or hydrogen sulfide proved to be poor, due to the formation of the difficult-to-reduce sulfate ion. Dissolved $SO_2$ promotes the conversion of ferric chelate to ferrous chelate, perhaps by:

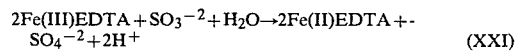

$$2Fe(III)EDTA + SO_3^{-2} + H_2O \rightarrow 2Fe(II)EDTA + SO_4^{-2} + 2H^+ \quad (XXI)$$

and also the NO adduct, perhaps by:

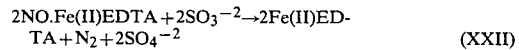

$$2NO \cdot Fe(II)EDTA + 2SO_3^{-2} \rightarrow 2Fe(II)EDTA + N_2 + 2SO_4^{-2} \quad (XXII)$$

But during said conversions, the dissolved $SO_2$ is oxidized to sulfate ion in a manner similar to that which occurs when the feed gas contains $NO_2$. Thus, it is apparent that both ferric chelate and $NO_2$ and even the NO adduct will promote the formation of sulfate ion, with essentially full conversion of the dissolved $SO_2$ to sulfate ion occurring when the feed gas is low in $SO_2$ relative to $NO_X$ (as in Example IV) and partial conversion occurring when the feed is relatively high in $SO_2$ (as in Example III).

In view of the foregoing, it can be seen, when feeds containing both $SO_2$ and $NO_X$ are treated with an absorbent solution containing an iron chelate, that high removals of $NO_X$ and conversions thereof to elemental nitrogen are possible but only with a drop in the yield of sulfur or hydrogen sulfide, at least when mild regenerator temperatures (e.g., 150° to about 300° F.) are utilized. On the other hand, one can obtain high yields of sulfur and/or hydrogen sulfide when treating feeds containing $SO_2$ and $NO_X$, as in Example II, by utilizing absorbent solutions free of iron chelate. This method, however, drastically lowers the absorption of NO from the gas stream into the absorbent solution. (As shown by the data in Table III, the absorption of NO in the absence of iron chelate is only about 11% effective.).

Thus, for effective treatment of gas streams containing both $SO_X$ and NO compounds, it is preferred that the ferrous chelate-containing absorbent be utilized and that temperatures above about 300° F., preferably above about 450° F., and most preferably above about 550° F., be utilized in the regenerator. Under such severe conditions, it is believed that the difficulties posed by sulfate formation will be removed, the sulfate ion being converted by reduction to hydrogen sulfide. In this embodiment of the invention, therefore, a $SO_X$ and NO-containing gas stream is treated for simultaneous removal of $SO_X$ and NO, and also of any $NO_2$ if present, and the regeneration of the absorbent is such that the dissolved $SO_X$ compounds are converted to hydrogen sulfide and the dissolved $NO_X$ compounds are converted to elemental nitrogen.

Although the invention has been described in conjunction with a preferred embodiment and examples thereof, it is apparent that many variations, alternatives, and modifications of the invention are contemplated, among which are included:

(1) Oxalic acid may be substituted for formic acid added via line 13 as make-up to the absorbent solution containing the reaction product of formic acid and the alkanolamine containing a tertiary amine functional group. In this modification, increased operational difficulties will ensue due to the corrosiveness of oxalic acid and its tendency to yield oxalate salt precipitate. The formation of such precipitates, however, may be minimized by operating the process such that the pH of the regenerated absorbent recovered in line 19 is a pH above about 4.8 and by utilizing excess chelating agent (e.g., EDTA and HEDTA), usually about a 100% excess above that required to produce ferrous chelate in the aqueous absorbent.

(2) It has been shown how the catalytic absorbent composition of the invention is useful to reduce a number of sulfoxy anions to elemental sulfur and/or hydrogen sulfide. It should be apparent, however, that many other sulfoxy anions besides those hereinbefore specified may be reduced in like manner, as for example, polythionate ion according to a chemical reaction such as:

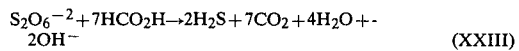

$$S_2O_6^{-2} + 7HCO_2H \rightarrow 2H_2S + 7CO_2 + 4H_2O + 2OH^- \quad (XXIII)$$

(3) It has been shown that NO may be absorbed in absorber 2 and converted therein to elemental nitrogen, and it should be apparent, for those gas streams containing NO which are relatively free of oxygen, e.g., less than 0.5 vol.% oxygen, preferably less than 0.1 vol.% oxygen, that a regenerator is not needed. The main purpose of the regenerator when NO-containing gases are treated is to reduce ferric chelate back to ferrous chelate according to Reaction (XX). But if the gas stream treated is relatively free of oxygen, then little ferric chelate forms, and the formic acid-ferrous chelate-alkanolamine absorbent is suitable in the absorber itself for both absorbing NO and reducing it to elemental nitrogen (especially when dissolved $SO_2$ is present therein), provided that formic acid is added thereto to effect the desired conversion according to Reaction (XIX) and provided further that the absorbent is at a suitable temperature for reducing dissolved NO to nitrogen, with temperatures above about 125° F. usually being effective and temperatures above about 150° F. being preferred.

(4) $NO_2$ may be removed from a gas stream and converted in absorber 2 to elemental nitrogen in a manner similar to that for NO. The elevated temperatures which will usually be required to effect the desired conversion are above about 180° F. In this embodiment of the invention, no ferrous chelate need be in the absorbent because $NO_2$ is readily soluble in aqueous media, and oxygen may therefore be more easily tolerated in the gas stream entering the absorber than is the case when the removal of NO is desired.

(5) It should also be understood that, although the catalytic absorbent composition herein has been described as an aqueous absorbent, non-aqueous media may also be used. Aqueous absorbents are the most useful absorbents, but organic absorbents are also contemplated. Among these are the glycols and other high boiling polyhydric alcohols. (However, it must be noted that these absorbents are not preferred when $NO_x$ compounds are in the feed gas, due to the possibility of forming potentially explosive organic nitro compounds.)

(6) In another embodiment of the invention, extremely high removals of NO from NO and $O_2$-containing gas streams relatively free of $SO_x$ compounds (and particularly $SO_2$), are accomplished when the regenerator temperature is above about 260° F., as for example, at preferred temperatures between about 260° and 300° F. With gas streams containing essentially no $SO_x$ compounds but containing 3.4 vol.% oxygen and about 532 ppmv NO, NO removals of about 85% or higher are easily obtained. In one experiment with a feed gas of the foregoing composition, an 85% removal of NO was obtained with the regenerator operating at 270° F. and the absorber at 130° F., and with the absorbent composition comprising, in aqueous media, 2.2 molar formic acid, 1.05 molar triethanolamine, and ferrous chelate (0.125 molar iron and 0.38 molar EDTA), said absorbent having a pH when regenerated of 4.65.

It is intended to embrace within the invention these and all other alternative embodiments that fall within the spirit and scope of the appended claims.

We claim:

1. A process for removing NO from a feed gas stream and converting said NO to elemental nitrogen, which process comprises (1) contacting said feed gas with an aqueous liquid absorbent comprising a ferrous chelate and the reaction product of formic acid and an alkanolamine containing a tertiary amine functional group in an absorption zone wherein said NO is removed and wherein fresh absorbent is continuously introduced and spent absorbent continuously withdrawn, (2) regenerating said withdrawn spent absorbent by subjecting the spent absorbent in the presence of added formic acid or oxalic acid to an elevated temperature above about 150° F. in a regeneration zone under conditions such that the spent absorbent is more active for removing NO, (3) recycling regenerated absorbent obtained from step (2) to step (1), and (4) controlling the amount of ferrous chelate introduced into said absortion zone such that, on an hourly basis, more than 1 but less than about 20 moles of ferrous chelate enter said absorption zone per mole of NO.

2. A process as defined in claim 1 wherein said feed gas stream also contains $SO_2$.

* * * * *